Patented Nov. 17, 1953

2,659,752

UNITED STATES PATENT OFFICE 2,659,752

METHOD FOR PREPARING BETA-(ARYLSULFONYL) CARBOXYLIC ACIDS AND SALTS THEREOF

James T. Gregory, Akron, Ohio, assignor to The B. F. Goodrich Company, New York, N. Y., a corporation of New York No Drawing. Application August 9, 1951, Serial No. 241,161

10 Claims. (Cl. 260—515)

This invention relates to a method for preparing beta-(arylsulfonyl) carboxylic acids and salts thereof, and pertains more specifically to the preparation of such compounds by the reaction of beta-lactones with aryl sulfinic acids or salts of aryl sulfinic acids.

It is disclosed in U. S. Patent 2,356,459 to Frederick E. Küng that beta-lactones, that is, lactones or inner esters of beta-hydroxy carboxylic acids, may be obtained in good yields by the reaction of a ketene with an aldehyde or ketone. In this manner, beta-propiolactone (also called hydracrylic acid lactone) which has the structure

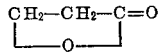

is economically obtained from ketene and formaldehyde. The ease with which beta-propiolactone and other saturated aliphatic beta-lactones are now obtained makes it desirable to use these compounds as starting materials in the synthesis of many useful compounds.

It has now been discovered that beta-propiolactone, and also other saturated aliphatic beta-lactones, will react with aryl sulfinic acids or salts thereof to give good yields of beta-(arylsulfonyl) carboxylic acids or salts, which acids and salts are useful for many purposes.

The reaction of beta-lactones with aryl sulfinic acids or salts is believed to proceed substantially according to the following equation:

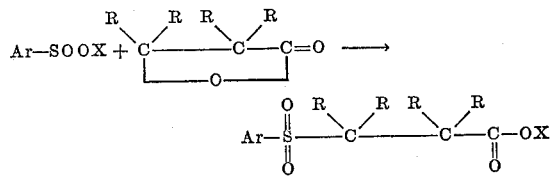

wherein Ar represents an aryl or halogenated aryl radical, X is hydrogen or a positive salt forming group and each R is a member of the class consisting of hydrogen or a substituent radical.

The reaction depicted in the above equation has been found to proceed quite readily without special conditions whenever it is possible to bring the reactants into efficient contact with one another. Since aryl sulfinic acids and their salts are not appreciably soluble in beta-lactones, bringing together of the reactants is ordinarily accomplished by the use of a solvent in which the sulfinic acid or salt and the beta-lactone will dissolve. Many beta-lactones, as well as many aryl sulfinic acids and their salts are soluble in water; hence, the carrying out of the reaction in aqueous solution is the most convenient method of procedure, although in some instances it may be desirable to employ other polar solvents such as alcohols or ketones and the like.

As indicated by the general equation, one molecular proportion of beta-lactone for each molecular proportion of the aryl sulfinic acid or salt is stoichiometrically required for the reaction and substantially this amount is preferably employed, but an excess of either of the reactants may be used without any appreciable influence on the yield of the desired product. Other conditions for the reaction, such as temperature and pressure, are not critical and may be varied widely. Highest yields of the desired product are generally secured when working at temperatures of 0° C. to 100° C., preferably at about 0° C. to 50° C., and at atmospheric pressure. The most convenient temperature, especially when the reaction is carried out in aqueous solution is from about 10° C. to 30° C., since the reaction tends to be slightly exothermic and this temperature is maintained without appreciable heating or cooling of the solution. Temperatures as low as —20° C. or lower, or as high as 150° C. or higher, however, are also operative.

Any aryl sulfinic acid or aryl sulfinic acid salt may be reacted with beta-lactones in accordance with the present invention. Since the reaction is preferably carried out in aqueous solution, aryl sulfinic acids and salts which are water-soluble are, of course, preferably used. Examples of preferred aryl sulfinic acids and salts include benzene sulfinic acid, o-toluenesulfinic acid, m-toluenesulfinic acid, p-toluenesulfinic acid, o-chlorobenzenesulfinic acid, p-chlorobenzenesulfinic acid, 2,5-dichlorobenzenesulfinic acid and the alkali metal and ammonium salts of these acids, for example, sodium benzenesulfinate, sodium p-toluenesulfinate, potassium m-toluenesulfinate, ammonium 2,5-dichlorobenzene sulfinate, and the like. Other aryl sulfinic acids and salts which may be utilized include naphthalenesulfinic acid, sodium naphthalenesulfinate, ammonium naphthalenesulfinic acid, phenanthrenesulfinic acid, potassium phenanthrenesulfinic acid, and the like. From the above enumerated examples, it will be readily apparent that the terms aryl sulfinic acid and aryl sulfinic acid salts, as used in this specification and appended claims, are meant to include compounds in which the —SOO group is attached directly to a carbon atom of an aromatic ring and in which the aryl portion of the molecule has an aromatic nucleus containing from one to three phenyl rings, and halogen and aliphatic hydrocarbon substituted derivatives of such aromatic nuclei.

It will be noted that all of the aryl sulfinic acids and their salts which are reacted with beta-lactones in accordance with this invention possess the structure Ar—SOOX, wherein Ar is an aryl or halogenated aryl radical and X is hydrogen or a positive salt forming group. A comprehensive survey of methods for the preparation of arylsulfinic acids and their salts is set forth in Chemical Reviews, volume 48, page 69 (1951).

Beta-propiolactone, the simplest possible beta-lactone, is the preferred beta-lactone for use in this invention because of its low cost, and the ease with which it reacts with aryl sulfinic acids and their salts to produce beta-(arylsulfonyl) carboxylic acids or their salts. However, the homologs of beta-propiolactone, that is, other saturated aliphatic beta-lactones such as beta-butyrolactone, beta-isobutyrolactone, beta-valero-lactone, beta-n-caprolactone, alpha-ethyl-beta-propiolactone, alpha-isopropyl-beta-propiolactone, alpha-butyl-beta-propiolactone, alpha-methyl-beta-butyrolactone, alpha-ethyl-beta-butyrolactone, beta-methyl-beta-valero-lactone and the like may also be used, as may other beta-lactones to produce numerous other beta-(arylsulfonyl) carboxylic acids and salts. All of these beta-lactones possess the structure

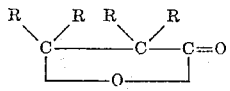

wherein each R is hydrogen or an alkyl radical, preferably a lower alkyl radical such as methyl, ethyl, propyl, butyl or amyl.

The beta-(arylsulfonyl) carboxylic acids and their salts obtained as products of the reaction are useful organic compounds. For example, the acids may be reacted with alcohols to give esters which are useful plasticizers for synthetic resins and rubbers. In addition to being useful as intermediates in the preparation of other compounds, the free acids and their salts are useful when combined with a fluent carrier, as agents for the control of insects, as fungicides, as plant hormones, and for other biological purposes. All of these compounds are characterized structurally by possessing an arylsulfonyl radical attached in beta position to a carboxylic acid function consisting of a carbonyl group attached to an oxygen atom which is in turn attached to a positive radical of an ionizable compound, such as hydrogen (the positive radical of acids and water) or an ammonium, substituted ammonium or metallic radical (all of which are positive radicals of bases and salts).

The more detailed practice of the invention is illustrated by the following examples, wherein all parts are given by weight. There are, of course, many other reaction procedures which are operative in addition to those of the specific examples and which will be apparent to those skilled in the art.

Example I 10.8 parts (0.15 mole) of beta-propiolactone are added to a stirred solution of 26.7 parts (0.15 mole) of sodium p-toluenesulfinate in 200 parts of water maintained at 25° C. The temperature reaches a maximum of 31° C. within forty minutes and after an additional two hours the solution is acidified with hydrochloric acid to convert the unreacted sodium p-toluenesulfinate and the sodium beta-(p-tolylsulfonyl) propionate to the corresponding free acid and thus facilitate the separation of the desired product from the reaction mixture. On cooling a light yellow oil separates and then solidifies. This solid is separated by filtration and digested in refluxing water for seven hours in order to oxidize the unreacted p-toluenesulfinic acid to di-p-tolyldisulfide. The solution is then made basic by adding 8 parts of sodium hydroxide and the di-p-tolyldisulfide is easily removed by filtering. The filtrate is then acidified with concentrated hydrochloric acid and 20 parts (58.2%) of beta-(p-tolylsulfonyl) propionic acid (M. P. 109–110.5° C. after two recrystallizations from water) are obtained.

Analysis:

|  | Calculated for $C_{10}H_{12}O_4S$ | Found |
| --- | --- | --- |
| C | 52.62 | 52.64 |
| H | 5.29 | 5.30 |
| S | 14.05 | 13.96 |
| Neutral Equivalent | 228.3 | 229.9 |

Example II

Example I is repeated except that the final acidification step is eliminated. Sodium beta-(p-tolylsulfonyl) propionate is obtained in good yield.

Example III 10.8 parts of beta-propiolactone are added to a stirred mixture of 23.4 parts of toluenesulfinic acid in 100 parts of water. The solution is then refluxed for seven hours and after cooling to room temperature the crystalline product which forms is filtered, washed with water and dried. The solid material is treated with boiling water and 6 parts of p-toluenethiosulfonate separate as an oil. A substantial yield of beta-(p-tolylsulfonyl) propionic acid (M. P. 106° C.–107° C.) separates on cooling of the aqueous solution. The melting point of a mixture of this product with an authentic sample prepared according to Example I was not depressed.

Example IV

Example II is repeated except that sodium benzene sulfinate is substituted for the p-toluenesulfinic acid. A good yield of beta-(phenylsulfonyl) propionic acid (M. P. 119°–120° C.) is obtained.

Analysis:

|  | Calculated for $C_9H_{10}O_4S$ | Found |
| --- | --- | --- |
| C | 50.49 | 50.55 |
| H | 4.67 | 4.72 |
| S | 14.94 | 14.89 |
| Neutral Equivalent | 214 | 215 |

Example V

Example II is repeated substituting sodium chlorobenzenesulfinate for the p-toluenesulfinic acid. Beta-(p-chlorophenylsulfonyl) propionic acid (M. P. 142°–143° C.) is obtained.

Analysis:

|  | Calculated for $C_9H_9ClO_4S$ | Found |
| --- | --- | --- |
| C | 43.47 | 43.51 |
| H | 3.65 | 3.68 |
| S | 12.89 | 12.87 |
| Cl | 14.26 | 14.35 |
| Neutral Equivalent | 248.7 | 250.4 |

When the example is repeated with p-chlorobenzenesulfinic acid, beta-(p-chlorophenylsulfonyl) propionic acid is again obtained.

Example VI

Example II is repeated utilizing sodium 2,5-dichlorobenzenesulfinate instead of p-toluenesulfinic acid. A 30% yield of beta-(2,5-dichlorophenylsulfonyl) propionic acid (M. P. 149–150° C.) is obtained. This acid is also obtained when 2,5-dichlorobenzenesulfinic acid is substituted for the p-toluenesulfinic acid of Example II.

Analysis:

| | Calculated for $C_9H_8Cl_2O_4S$ | Found |
|---|---|---|
| C | 38.18 | 38.27 |
| H | 2.85 | 3.15 |
| S | 11.32 | 11.43 |
| Cl | 25.05 | 25.03 |
| Neutral Equivalent | 283.1 | 288.6 |

Example VII

Example I is repeated substituting beta-butyrolactone for the beta-propiolactone. Beta-(p-tolylsulfonyl) butyric acid is obtained in good yield.

Similarly, when other arylsulfinic acids or salts and other beta-lactones selected from those disclosed hereinabove are substituted in the examples, solid, crystalline beta-(arylsulfonyl) carboxylic acids and their salts are obtained in good yield.

Numerous variations and modifications will be apparent to those skilled in the art and are included within the spirit and scope of the invention as defined in the appended claims.

I claim:

1. The method which comprises reacting in a mutual polar solvent at a temperature of from about −10° C. to about 150° C. a saturated aliphatic beta-lactone of the structure

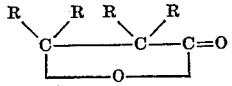

wherein each R is selected from the class consisting of hydrogen and lower alkyl radicals, and a compound of the structure Ar—SOOX, wherein Ar is selected from the class consisting of aryl and halogenated aryl radicals and X is selected from the class consisting of hydrogen and positive salt forming groups, said salt forming groups imparting water solubility to the salt derivatives of said compound, thereby to obtain a compound of the structure

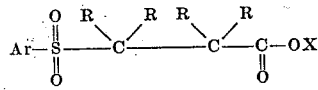

wherein Ar, each R and X have the same significance as above.

2. The method which comprises reacting at a temperature between about −10° C. and 150° C. in a mutual polar solvent beta-propiolactone and a compound of the structure Ar—SOOX, wherein Ar is selected from the class consisting of aryl and halogenated aryl radicals said aryl radicals having from one to 3 phenyl rings and X is selected from the class consisting of hydrogen and positive salt forming groups, said groups imparting water solubility to the salt derivative of said compound thereby to obtain a compound of the structure

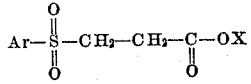

wherein Ar and X have the same significance as above.

3. The method which comprises reacting at a temperature of from about 0° C. to about 100° C. in aqueous solution beta-propiolactone and a water-soluble compound of the structure Ar—SOOX, wherein Ar is selected from the class consisting of aryl and halogenated aryl radicals, said aryl nucleus having from one to three phenyl rings and X is selected from the class consisting of hydrogen and positive salt forming groups, said groups imparting water solubility to the salt derivatives of said compound thereby to obtain a compound of the structure

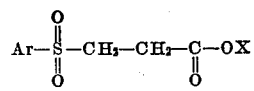

wherein Ar and X have the same significance as above.

4. The method which comprises reacting in aqueous solution beta-propiolactone and a water-soluble aryl sulfinic acid, at a temperature between about 0° C. and 100° C. thereby to obtain a beta-(arylsulfonyl) propionic acid.

5. The method of claim 4 wherein the arylsulfinic acid is p-toluenesulfinic acid, the product obtained being beta-(p-tolylsulfonyl) propionic acid.

6. The method which comprises reacting in aqueous solution beta-propiolactone and a water-soluble salt of an aryl sulfinic acid, at a temperature between about 0° C. and 100° C. and then acidifying the reaction mixture, thereby to obtain a beta-(arylsulfonyl) propionic acid.

7. The method of claim 6 wherein the aryl sulfinic acid salt is sodium benzenesulfinate, the product obtained being beta-(phenylsulfonyl) propionic acid.

8. The method which comprises reacting at a temperature between about 0° C. and 100° C. in aqueous solution beta-propiolactone and a water-soluble salt of an acid having the structure Ar—SOOH, wherein Ar is a halogenated aryl radical having from one to 3 phenyl rings, and then acidifying the reaction mixture, thereby to obtain a compound of the structure

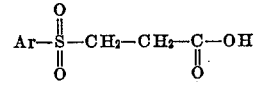

wherein Ar has the same significance as above.

9. The method of claim 8 wherein the salt of the acid of the structure Ar—SOOH is sodium monochlorobenzenesulfinate the product obtained beting beta-(chlorophenylsulfonyl) propionic acid.

10. The method of claim 8 wherein the salt of the acid of the structure Ar—SOOH is sodium 2,5-dichlorobenzenesulfinic acid, the product obtained being beta-(2,5-dichlorophenylsulfonyl) propionic acid.

JAMES T. GREGORY.

References Cited in the file of this patent

UNITED STATES PATENTS

| Number | Name | Date |
|---|---|---|
| 2,449,987 | Gresham | Sept. 28, 1948 |

OTHER REFERENCES

Schjanberg, Ber. Deut. Chem., vol. 76B, pp. 287–98 (1943).